(12) United States Patent
Bogue

(10) Patent No.: US 7,118,071 B2
(45) Date of Patent: Oct. 10, 2006

(54) METHODS AND SYSTEMS FOR CONTROLLING LOWER SURFACE SHOCKS

(75) Inventor: David R. Bogue, Seattle, WA (US)

(73) Assignee: The Boeing Company, Seattle, WA (US)

( * ) Notice: Subject to any disclaimer, the term of this patent is extended or adjusted under 35 U.S.C. 154(b) by 86 days.

(21) Appl. No.: 10/815,147

(22) Filed: Mar. 31, 2004

(65) Prior Publication Data

US 2006/0060720 A1    Mar. 23, 2006

(51) Int. Cl.
*B64C 1/38*    (2006.01)
(52) U.S. Cl. ............... 244/130; 244/204; 244/200; 244/75.1
(58) Field of Classification Search ............... 244/1 N, 244/35 A, 75.1, 130, 200, 201, 204
See application file for complete search history.

(56) References Cited

U.S. PATENT DOCUMENTS

| | | | |
|---|---|---|---|
| 4,121,787 A * | 10/1978 | Wilby | 244/35 R |
| 4,815,680 A | 3/1989 | Goldhammer | |
| 5,018,683 A * | 5/1991 | Hahn et al. | 244/1 R |
| 5,171,623 A * | 12/1992 | Yee | 428/156 |
| 5,378,524 A * | 1/1995 | Blood | 428/141 |
| 5,676,333 A | 10/1997 | Rethorst | |
| 5,692,709 A * | 12/1997 | Mihora et al. | 244/204 |
| 6,588,703 B1 * | 7/2003 | Hartmann | 244/35 R |

OTHER PUBLICATIONS

Birkemeyer, J. et al. "Shock control on a swept wing," Aerospace Science and Technology; (1 pg); http//www.2.dlr.de.lido.SM-SK/2000/1714502000.html [accessed Jul. 5, 2004].
Hehs, Eric, "JSF Diverterless Supersonic Inlet," Code One Lockheed Martin Aeronautics Company; http://codeonemagazine.com/archives/2000/articles/july_00/divertless_1.html [accessed Feb. 21, 2004].
Kanazaki, Masahiro, "Numerical Simulation of Supersonic Flow Around Wing-Body Configuration with Integrated Engine Nacelle," [date unknown] American Institute of Aeronautics and Astronautics, AIAAA-2002-0836, Tohoku University Sendai, Japan.
Drag Reduction by Shock and Boundary Layer Control, Jan. 4, 1996, European Commission.
Whitcomb area rule; http://en.wikipedia.org/wiki/Whitcomb_area_rule (2 pgs) [accessed Jul. 5, 2004].

* cited by examiner

*Primary Examiner*—Peter M. Poon
*Assistant Examiner*—T. D. Collins
(74) *Attorney, Agent, or Firm*—Perkins Coie LLP

(57) ABSTRACT

Methods and systems for controlling shocks on airfoil lower surfaces are disclosed. An airfoil in accordance with one embodiment of the invention includes an upper surface portion having an upper surface positioned to face generally upwardly during the level flight, and a lower surface portion having a leading edge region, a trailing edge region and a lower surface positioned to face generally downwardly during level flight. A shock control protrusion extends away from the lower surface and is positioned to generate a shock extending away from the lower surface at a least one flight condition.

29 Claims, 3 Drawing Sheets

METHODS AND SYSTEMS FOR CONTROLLING LOWER SURFACE SHOCKS

TECHNICAL FIELD

The present invention is directed generally toward methods and systems for controlling lower surface shocks, including shocks formed on the lower surface of aircraft wings and other airfoils.

BACKGROUND

Modern commercial aircraft are typically designed to fly at high subsonic cruise Mach numbers to reduce the time spent aloft while avoiding the system complexities associated with supersonic flight. Accordingly, the aerodynamic performance of advanced subsonic aircraft wings is typically optimized at Mach numbers of from about 0.80 to about 0.85. However, the aircraft must demonstrate controllable flight at higher Mach numbers, which the aircraft may experience during high speed bursts and/or dives. At these conditions, the airflow passing adjacent to the wing (and particularly, the airflow passing adjacent to the upper surface of the wing) may accelerate to supersonic velocities before passing through a normal shock and decelerating to subsonic velocities upstream of the wing trailing edge.

One problem associated with the occurrence of adjacent supersonic and subsonic regions of the flow on the wing upper surface is that the static pressure in subsonic regions can be significantly higher than the static pressure in supersonic regions. Accordingly, the wing may be subject to atypical pressure gradients, which can stretch the capability of the control system. A further drawback is that the position of the shock wave separating supersonic flow from subsonic flow can shift significantly over the chord length of the wing, depending on factors including the aircraft angle of attack, freestream Mach number, sideslip angle and control surface deflection. The position of these shock waves is not always advantageous, and can limit design options to meet certification requirements.

One approach for addressing the foregoing drawbacks is to install a "shock bump" on the wing upper surface. The shock bump can include a generally smooth, faired projection that reduces the Mach number at which the shock wave occurs (thereby reducing shock losses), and can also provide a single location at which the shock tends to anchor, even when the freestream Mach number and/or angle of attack change. While the shock bump can improve the controllability of the airfoil at near sonic flight conditions, the level of increased stability and control that it provides may not be sufficient for all wing designs and/or may not be optimal, particularly for airfoils designed for cruise at Mach numbers close to 1.0.

SUMMARY

The present invention is directed toward methods and systems for controlling lower surface shocks. An airfoil in accordance with one aspect of the invention includes an upper surface portion having an upper surface positioned to face generally upwardly during level flight, and a lower surface portion having a leading edge region, a trailing edge region, and a lower surface positioned to face generally downwardly during level flight. The airfoil can further include a shock control protrusion extending away from the lower surface and positioned to generate a shock extending away from the lower surface at least one flight condition.

In further aspects of the invention, the shock control protrusion can be fixed or movable relative to the lower surface portion of the airfoil. The shock control protrusion can include a single shock control protrusion extending in a generally continuous manner from an inboard location on the lower surface to an outboard location on the lower surface, or the shock control protrusion can include one of a plurality of shock control protrusions extending along an axis from the inboard location to the outboard location.

A method in accordance with another aspect of the invention includes controlling airflow over an aircraft airfoil by moving an airfoil through an air mass so that a first airstream passes over an upper surface of the airfoil and a second airstream passes over a lower surface of the airfoil, with at least a portion of the second airstream being supersonic. The method can further include controlling a location of a shock in the second airstream by passing the second airstream over a shock control protrusion extending away from the lower surface so that the shock emanates from the protrusion.

In further aspects of the invention, the method can include moving an airfoil having a swept leading edge through the air mass at a subsonic or transonic speed. In still further aspects of the invention, the airfoil can include first and second generally symmetric airfoil portions positioned on opposite sides of a longitudinal axis of the aircraft, and the method can further comprise banking the aircraft while a location at which the shock emanates remains at least approximately stationary.

DETAILED DESCRIPTION

The present invention is directed generally toward methods and systems for controlling lower surface shocks, for example, shocks occurring on the lower surface of a wing, rotor, and/or other airfoil. Certain specific details are set forth in the following description and in FIGS. 1–5 to provide a thorough understanding of various embodiments of the invention. Well-known structures, systems and methods often associated with these aircraft systems have not been shown or described in detail to avoid unnecessarily obscuring the description of the various embodiments of the invention. Those of ordinary skill in the relevant art will understand that additional embodiments of the present invention may be practiced without several of the details described below.

Figure 1:
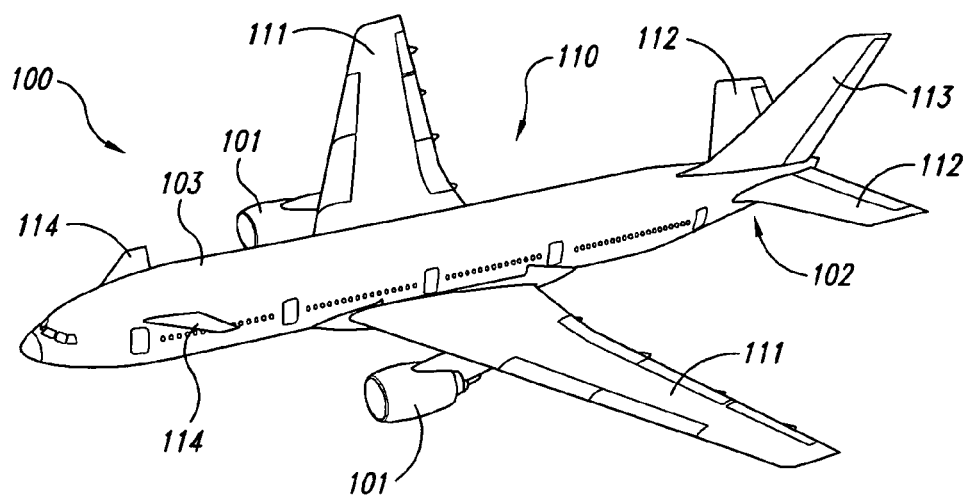
FIG. 1 is a partially schematic isometric illustration of an aircraft having shock control protrusions positioned in accordance with an embodiment of the invention.

FIG. 1 is an isometric illustration of an aircraft 100 having a fuselage 103 and one or more airfoils 110 configured in accordance with embodiments of the invention. The airfoils 110 can include wings 111, horizontal stabilizers 112, canards 114 and a vertical stabilizer 113. The wings 111 and canards 114 can be carried by the fuselage 103, and the horizontal stabilizers 112 and vertical stabilizer 113 can be carried by an empennage portion 102. The aircraft 100 can further include one or more engines 101 carried by the wings 111 (as shown in FIG. 1), the fuselage 103, and/or the empennage portion 102. As described in greater detail below with reference to FIGS. 2–5, one or more of the airfoils 110 can include shock control devices that control the strength and/or position of shocks formed at the airfoil lower surface during high speed flight.

Figure 2:
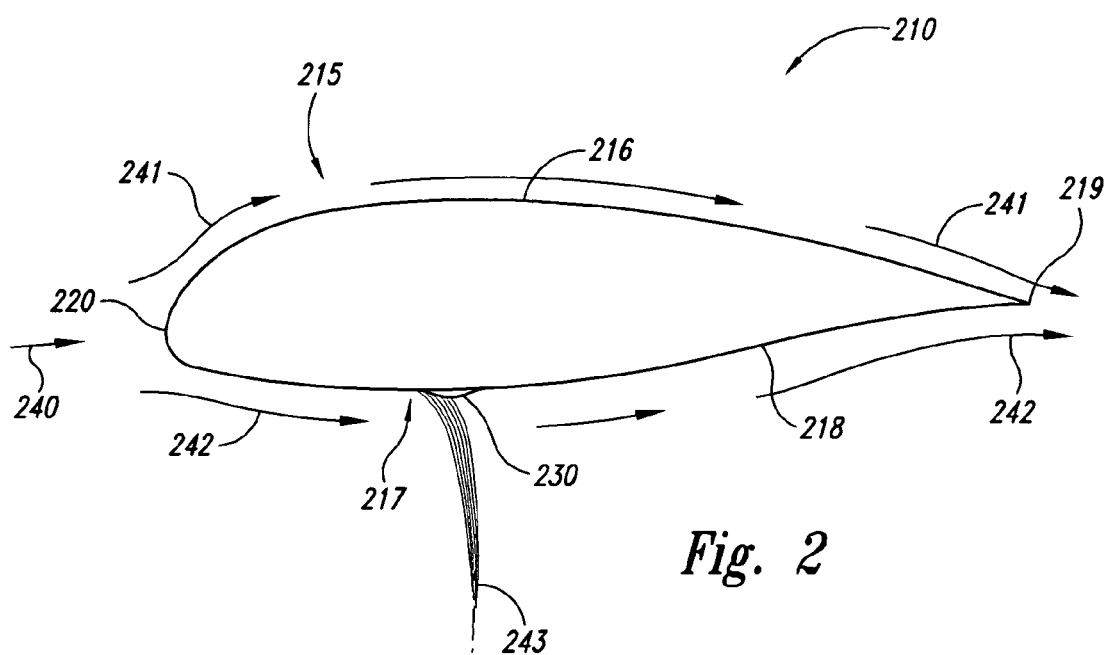
FIG. 2 is a partially schematic, cross-sectional illustration of an airfoil having at least one shock control protrusion on a lower surface, in accordance with an embodiment of the invention.

FIG. 2 is a cross-sectional illustration of an airfoil 210 having a shock control protrusion 230 configured and positioned in accordance with an embodiment of the invention. The characteristics of the airfoil 210 can be applied to the wings 111, the canards 114, and/or the horizontal stabilizers 112 of the aircraft 100 described above with reference to FIG. 1, and/or to other airfoils, e.g., rotorcraft rotors (as described below with reference to FIG. 5). The airfoil 210 can include a leading edge 220 and a trailing edge 219, with an upper surface portion 215 and a lower surface portion 217 extending between the leading edge 220 and the trailing edge 219. The upper surface portion 215 can include an upper surface 216, and the lower surface portion 217 can include a lower surface 218 facing generally opposite the upper surface 216. The upper surface portion 215 and the lower surface portion 217 can be formed simultaneously, or they can be formed individually and then joined. In either embodiment, the shock control protrusion 230 can extend downwardly away from the lower surface 218.

During operation, the airfoil 210 passes through a freestream flow 240 which splits to form a first or upper airstream 241 passing adjacent to the upper surface 216, and a second or lower airstream 242 passing adjacent to the lower surface 218. At high freestream Mach numbers, the lower airstream 242 may accelerate to supersonic velocities. Accordingly, the lower airstream 242 can first expand to a supersonic velocity, then pass through a shock 243 which decelerates the lower airstream 242 to a subsonic velocity, before the lower airstream 242 and the upper airstream 241 rejoin at the trailing edge 219. The shock control protrusion 230 can control the location of the shock 243 and/or the total pressure losses experienced by the flow as it passes through the shock 243, as described in greater detail below with reference to FIG. 3.

Figure 3:
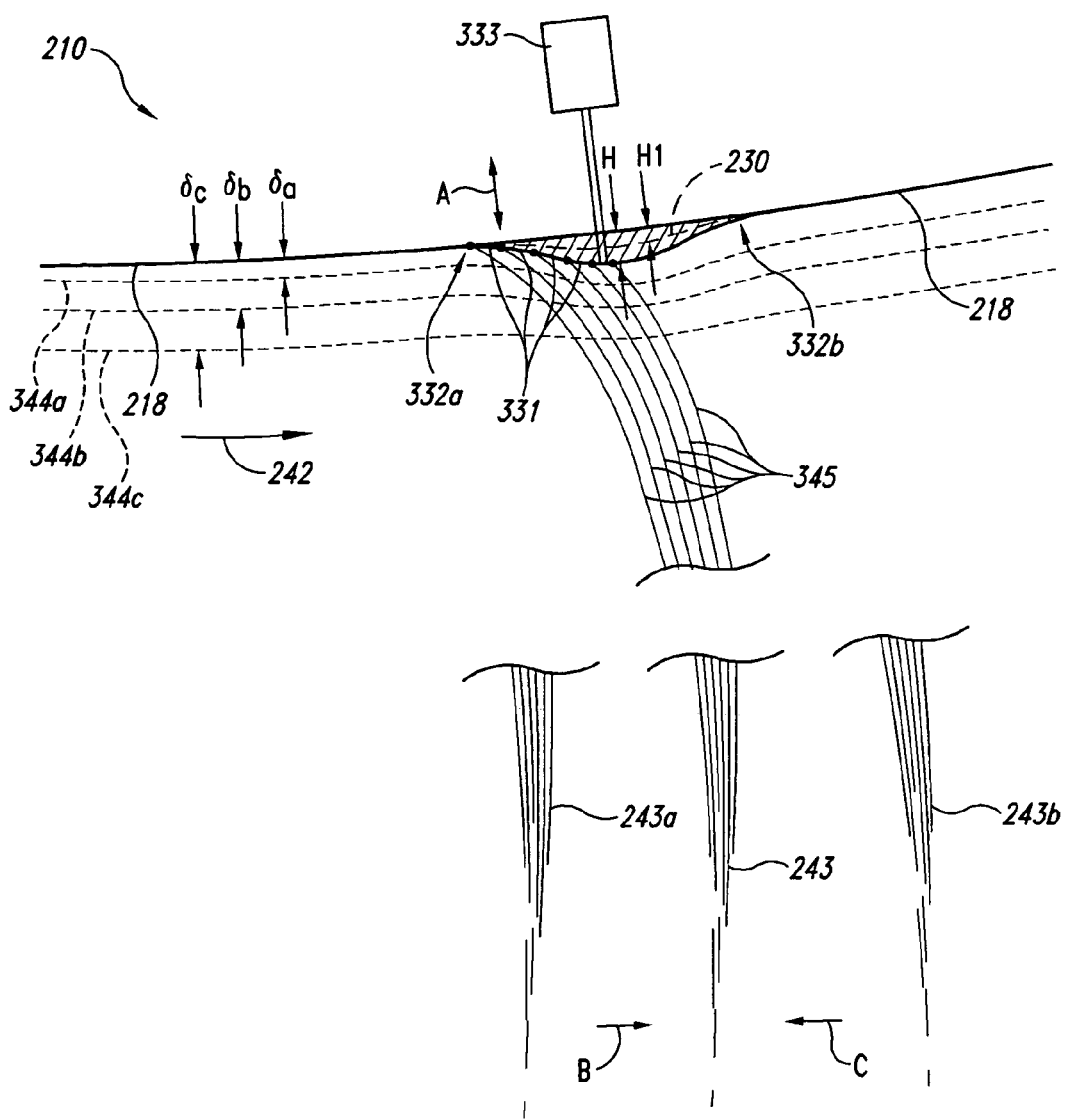
FIG. 3 is an enlarged view of the lower surface and protrusion shown in FIG. 2.

FIG. 3 is an enlarged view of the airfoil 210 and the shock control protrusion 230 described above with reference to FIG. 2. The shock control protrusion 230 can include a forward fairing 332a that smoothly blends with the lower surface 218 forward of the protrusion 230, and an aft fairing 332b that smoothly blends with the lower surface 218 aft of the protrusion 230. The shock control protrusion 230 can also include a plurality of segments 331 between the forward fairing 332a and the aft fairing 332b. In a particular embodiment, each of the segments 331 is sized and positioned to align with or approximately align with the characteristic lines associated with the Mach number just upstream of the segment 331. Accordingly, each segment 331 can generate an isentropic compression wave 345. The isentropic compression waves 345 can coalesce to form the shock 243 in a region spaced apart from the lower surface 218. The segments 331 can be straight or curved (in cross-section), and the intersections between adjacent segments 331, which are highlighted in FIG. 3 with dots, can be smooth (e.g., tangential) or abrupt.

The overall height H of the shock control protrusion 230 can be sized based on the thickness δ of the boundary layer upstream of the shock control protrusion 230. For example, the height H can be on the same order as the boundary layer thickness (e.g., less than an order of magnitude different than the upstream boundary layer thickness). Three different embodiments are shown in FIG. 3, illustrating the height H as being approximately twice the thickness δa of a boundary layer 344a, approximately the same as a thickness δb of a boundary layer 344b, or approximately half a thickness δc of a boundary layer 344c. In other embodiments, the height H of the shock control protrusion 230 relative to the upstream boundary layer thickness δ can have other values.

The airfoil 210 can include an actuator 333 coupled to the shock control protrusion 230 to move the shock control protrusion 230 relative to the lower surface 218 in response to changing freestream conditions. For example, the shock control protrusion 230 can include a flexible surface coupled to the actuator 333, which can move inwardly and outwardly as indicated by arrow A to change the effective height of the shock control protrusion 230. Accordingly, when the Mach number of the second airstream 242 is relatively high, the shock control protrusion 230 can be deployed to the height H, and when the Mach number of the second airstream 242 is lower, the shock control protrusion 230 can be at least partially retracted to have a height H1. The actuator 333 can be coupled to air data sensors (not shown in FIG. 3) so as to automatically move the shock control protrusion 230 in response to changing flight conditions. In other embodiments, the shock control protrusion 230 can be activated by the pilot or other aircraft operator. When the shock control protrusion 230 is not needed, it can be fully retracted to be flush with the lower surface 218.

In other embodiments, the shock control protrusion 230 can have a fixed location relative to the lower surface 218. Accordingly, the shock control protrusion 230 can be sized, configured and located to provide shock control over a range of Mach numbers. An advantage of the fixed shock control protrusion 230 is that it can be easier to install and less expensive to maintain than a deployable shock control protrusion 230. An advantage of the deployable shock control protrusion 230 is that its position can be more closely tailored to upstream flow conditions, and its potential adverse effect on drag can be reduced when it is stowed. On the other hand, aerodynamic drag on the lower surface 218 tends to be lower than aerodynamic drag on the upper surface 216 (FIG. 2), and therefore the fixed shock control protrusion may not significantly increase the overall aerodynamic drag on the airfoil 210.

One feature of embodiments of the shock control protrusion 230 described above with reference to FIGS. 2 and 3 is that it is located at the lower surface 218 of the airfoil 210. An advantage of this feature is that it can mitigate the effect of shocks emanating from the lower surface 218. For example, the shock control protrusion 230 can gradually compress the flow through a series of compression waves 345, thereby reducing the likelihood that the lower surface boundary layer will separate. Accordingly, the likelihood for significantly increasing the drag on the airfoil 210 can also be reduced.

Another feature of embodiments of the shock control protrusion 230 described above is that they can reduce the extent to which the shock 243 moves forward and aft over the lower surface 218 of the airfoil 210, even as upstream flow conditions change. For example, when upstream flow conditions change (e.g., as a result of a change in Mach number, bank angle, and/or pitch angle) and cause the shock 243 to move forward to a new location (indicated in FIG. 3 by shock 243a), the presence of the shock control protrusion 230 can tend to move the shock 243a back to the location indicated by shock 243 (as shown by arrow B). If the upstream flow conditions tend to move the shock 243 aft (as indicated by shock 243b), the presence of the shock control protrusion 230 can tend to move the shock forward to the location indicated by shock 243 (as shown by arrow C).

An advantage of the foregoing feature is that the aircraft 100 (FIG. 1) can have an increased margin of control and stability, even at flight conditions that cause shocks to emanate from the lower surface 218 of the airfoil 210. Such flight conditions may occur during high speed dives and/or maneuvers (e.g., changes in pitch, roll, and/or yaw angle) conducted at high speeds. For example, if the aircraft 100 yaws significantly at high speed (e.g., 2° or more), each wing 111 (FIG. 1) will experience a significantly different upstream Mach number. Without the shock control protrusions 230, the position of the shock on the lower surface of one wing 111 may be significantly different than the position of the shock on the lower surface of the opposite wing 111, potentially causing a significant change in handling characteristics and controllability of the aircraft. The shock control protrusions 230 can reduce this potential when applied to aircraft flying at conditions that may generate lower surface shocks. Accordingly, the shock control protrusions can increase the flight envelope over which the aircraft 100 remains controllable and stable.

Figure 4A:
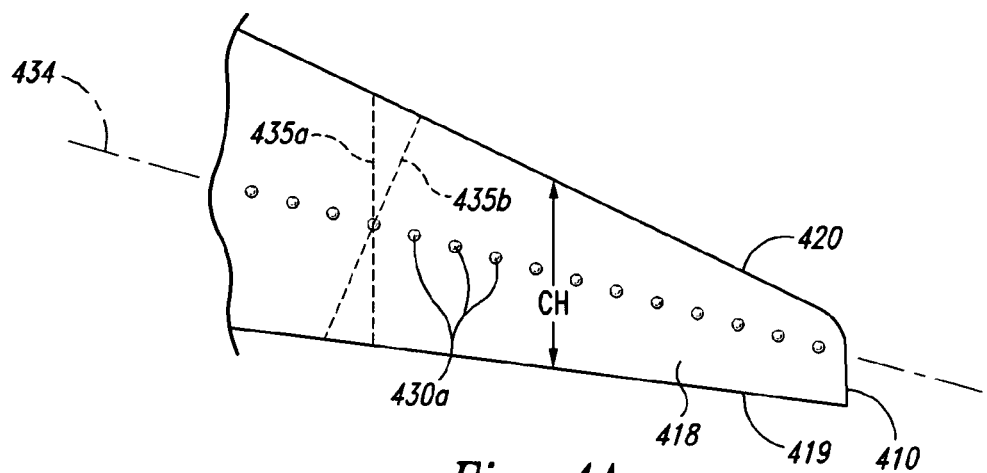
FIGS. 4A and 4B illustrate plan views of shock control protrusions configured and positioned in accordance with further embodiments of the invention.
Figure 4B:
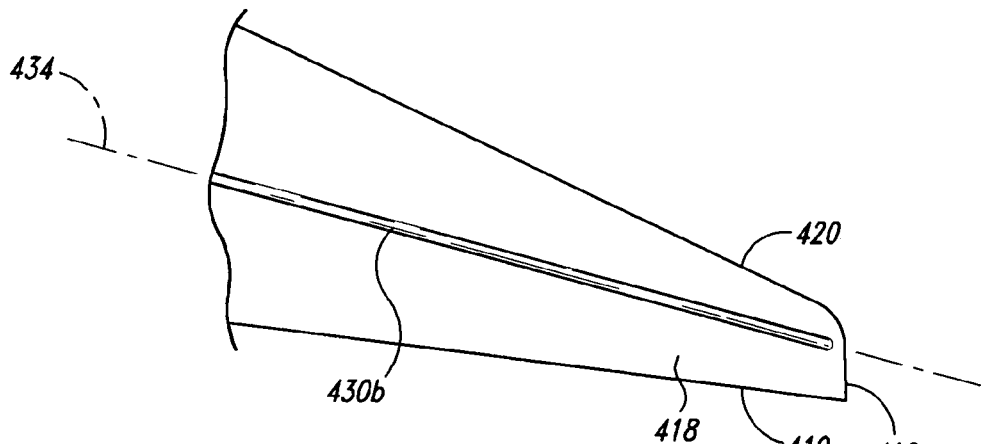
Figure 5:
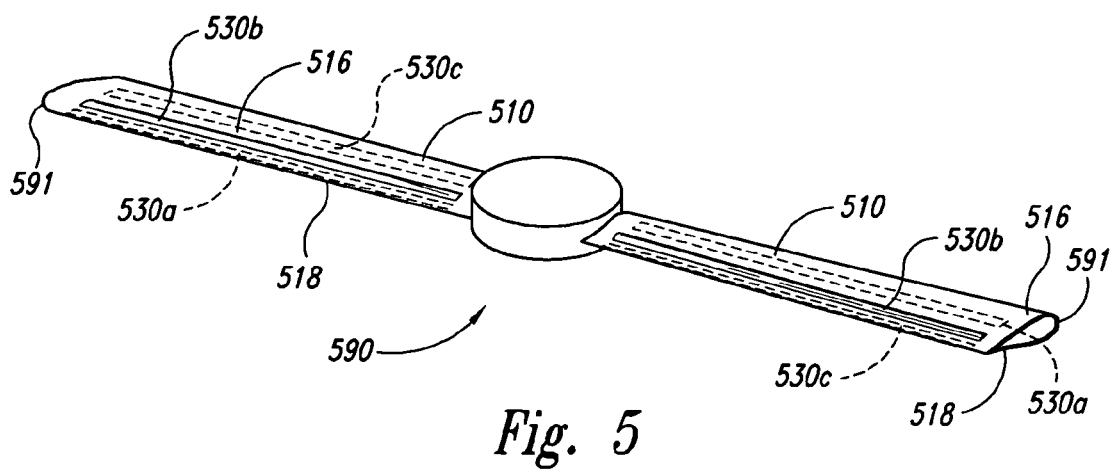
FIG. 5 is an isometric illustration of shock control protrusions installed on rotorcraft airfoils in accordance with still further embodiments of the invention.

FIGS. 4A and 4B illustrate airfoils 410 having shock control protrusions configured in accordance with further embodiments of the invention. Referring first to FIG. 4A, the airfoil 410 can include a leading edge 420, a trailing edge 419, and a lower surface 418. Multiple, spaced-apart shock control protrusions 430a are positioned along an axis 434 of the lower surface 418. In one aspect of this embodiment, the axis 434 can be aligned parallel to the leading edge 420. In another embodiment, the axis 434 can be positioned at the same fractional chordwise location over the span of the airfoil 410. For example, the shock control protrusions 430a can be positioned along an axis 434 that is located aft of the leading edge 420 by about 20% to about 50% of the overall chord length CH of the airfoil 410. In a particular embodiment, the axis 434 can be positioned aft of the leading edge 420 by about 30% of the overall chord length. In other embodiments, the shock control protrusions 430a can have other chordwise locations. Each shock control protrusion can have a chordwise extent of from about 5% to about 25% of the airfoil chord length (in one embodiment) and other chordwise extents in other embodiments. In any of these embodiments, the shock control protrusions 430a can have a shape generally similar to that shown in FIG. 3 when intersected by a first plane 435a (generally parallel to the freestream direction and perpendicular to the plane of FIG. 3) or a second plane 435b (generally perpendicular to the leading edge 420 and the plane of FIG. 3). The shock control protrusions 430a can be blended with the lower surface 418 of the wing in a direction transverse to either the first axis 435a or the second axis 435b so as to have a curved (e.g., circular) planform shape.

FIG. 4B illustrates the airfoil 410 with a single shock control protrusion 430b elongated along the axis 434. Accordingly, the shock control protrusion 430b can be generally continuous, although it can be manufactured from segments positioned adjacent to each other along the axis 434. The single shock control protrusion 430b can be simpler to install than the multiple shock control protrusions 430a, while the multiple shock control protrusions can have a reduced effect on drag and weight.

Embodiments of the shock control protrusions described above can be applied to the wings 111 or other airfoils 110 of the aircraft 100 described above with reference to FIG. 1. The airfoils 110 can be swept in one embodiment or unswept in other embodiments. The airfoils 110 can be configured for transonic cruise Mach numbers or supersonic cruise Mach numbers in still further embodiments. In yet further embodiments, the shock control protrusions can be applied to other airfoil surfaces. In one example, the shock control protrusions can be applied to movable surfaces (e.g., the canards 114 described above with reference to FIG. 1, or ailerons). In another example, shown in FIG. 5, one or more shock control protrusions 530 (shown as shock control protrusions 530a–530c) can be applied to a rotor 590. For example, the rotor 590 can include two rotor blades 591 having airfoil cross-sectional shapes with an upper surface 516 facing opposite from a lower surface 518. A first shock control protrusion 530a can be positioned on the lower surface 518. Optionally, the rotor 590 can include second shock control protrusions 530b positioned at the upper surface 516. In still a further aspect of this embodiment, the lower surface can include multiple shock control protrusions spaced apart in a chordwise direction, for example, the first shock control protrusions 530a and an aft, third shock control protrusion 530c.

The shock control protrusions described above with reference to FIG. 5 can be applied to airfoils other than the rotor 590, and/or can be either fixed or movable relative to the airfoil. In a particular embodiment in which the airfoil includes two lower surface shock control protrusions spaced apart in a chordwise direction, the shock control protrusions can be independently movable (e.g., as a function of freestream conditions) to deploy the protrusion best positioned to control the location and/or strength of a shock emanating from the lower surface.

From the foregoing, it will be appreciated that specific embodiments of the invention have been described herein for purposes of illustration, but that various modifications may be made without deviating from the spirit and scope of the invention. For example, certain features shown and/or described in the context of particular embodiments can be combined or eliminated in other embodiments. Accordingly, the invention is not limited except as by the appended claims.

I claim:

1. A transonic airfoil, comprising:
    an upper surface portion having an upper surface positioned to face generally upwardly during level flight;
    a lower surface portion having a leading edge region and a trailing edge region, the lower surface portion further having a lower surface positioned to face generally downwardly during level flight; and
    a shock control protrusion extending from the lower surface and having a generally downwardly and forward facing surface with an aft fairing generally smoothly blended with the lower surface, the shock control protrusion being positioned to generate a shock extending away from the lower surface at level flight Mach numbers of at least 0.80.

2. The airfoil of claim 1 wherein the lower surface and upper surface are configured for cruise at subsonic Mach numbers.

3. The airfoil of claim 1 wherein the shock control protrusion is fixed relative to the lower surface portion of the airfoil.

4. The airfoil of claim 1 wherein the shock control protrusion is movable relative to the lower surface portion of the airfoil.

5. The airfoil of claim 1 wherein the shock control protrusion includes a plurality of successive segments and, for at least one freestream Mach number, at least some of the successive segments are aligned with characteristic waves generated by the previous segment when the airfoil is flown at the at least one freestream Mach number.

6. The airfoil of claim 1 wherein the shock control protrusion includes a plurality of successive segments having generally tangential intersections and, for at least one freestream Mach number, at least some of the successive segments are aligned with characteristic waves generated by the previous segment when the airfoil is flown at the at least one freestream Mach number.

7. The airfoil of claim 1 wherein the shock control protrusion has a forward portion smoothly blended with the lower surface at a first location and wherein the shock control protrusion has an aft portion smoothly blended with the lower surface at a second location aft of the first location.

8. The airfoil of claim 1 wherein the shock control protrusion includes a single shock control protrusion extending in a generally continuous manner from an inboard location on the lower surface to an outboard location on the lower surface.

9. The airfoil of claim 1 wherein the shock control protrusion includes one of a plurality of shock control protrusions extending along an axis from an inboard location on the lower surface to an outboard location on the lower surface.

10. The airfoil of claim 1 wherein the lower surface portion has an expected boundary layer thickness at a selected freestream Mach number and airfoil location, and wherein the shock control protrusion is positioned at the airfoil location, with a maximum extent of the shock control protrusion away from the lower surface portion being of the same order as the expected boundary layer thickness.

11. The airfoil of claim 1 wherein the upper and lower surface portions include upper and lower surface portions of an aircraft wing.

12. The airfoil of claim 1 wherein the shock control protrusion has a chordwise extent in the range of from about 5% to about 25% of a chord length of the airfoil.

13. The airfoil of claim 1 wherein the upper and lower surface portions include upper and lower surface portions of a movable aircraft flight control device.

14. The airfoil of claim 1 wherein the upper and lower surface portions include upper and lower surface portions of a rotorcraft rotor.

15. The airfoil of claim 1 wherein the upper and lower surface portions define a chord length and wherein the shock control protrusion is positioned aft of a leading edge of the airfoil by a distance in the range of from about 20% to about 50% of the chord length.

16. The airfoil of claim 1 wherein the shock control protrusion includes a first shock control protrusion at a first chordwise location, and wherein the airfoil further comprises a second shock control protrusion at a second chordwise location different than the first chordwise location.

17. A transonic airfoil, comprising:
an upper surface portion having an upper surface positioned to face generally upwardly during level flight;
a lower surface portion having a leading edge region and a trailing edge region, the lower surface portion further having a lower surface positioned to face generally downwardly during level flight; and
a plurality of shock control protrusions extending from the lower surface and having a generally downwardly facing surface with an aft fairing generally smoothly blended with the lower surface, with individual shock control protrusions being positioned to generate a shock extending away from the lower surface at level flight Mach numbers of at least 0.80.

18. The airfoil of claim 17 wherein the leading edge region includes a leading edge that is swept along a first axis, and wherein the individual shock control protrusions are aligned along a second axis generally parallel to the first axis.

19. The airfoil of claim 17 wherein the individual shock control protrusions are blended with the lower surface, with an edge of the shock control portions being generally tangential to the lower surface.

20. The airfoil of claim 17 wherein the shock control protrusions have a generally circular planform shape.

21. The airfoil of claim 17 wherein the shock control protrusions are fixed relative to the lower surface.

22. The airfoil of claim 17 wherein the shock control protrusions are movable relative to the lower surface.

23. A transonic aircraft, comprising:
a fuselage; and
an airfoil coupled to the fuselage, the airfoil including:
an upper surface portion having an upper surface positioned to face generally upwardly during level flight;
a lower surface portion having a leading edge region and a trailing edge region, the lower surface portion further having a lower surface positioned to face generally downwardly during level flight; and
a shock control protrusion extending from the lower surface and having a generally downwardly and forward facing surface with an aft fairing generally smoothly blended with the lower surface, the shock control protrusion being positioned to generate a shock extending away from the lower surface at level flight Mach numbers of at least 0.80.

24. The aircraft of claim 23 wherein the airfoil includes only a wing.

25. The aircraft of claim 23 wherein the airfoil includes at least one of a wing, a horizontal stabilizer, a tail, a rotor, a canard, and a movable flight control surface.

26. The aircraft of claim 23 wherein the shock control protrusion is fixed relative to the lower surface portion of the airfoil.

27. The aircraft of claim 23 wherein the shock control protrusion includes a plurality of successive segments and, for at least one freestream Mach number, the successive segments are aligned with characteristic waves generated by the previous segment when the airfoil is flown at the at least one freestream Mach number.

28. The airfoil of claim 23 wherein the shock control protrusion includes a single shock control protrusion extending in a generally continuous manner from an inboard location on the lower surface to an outboard location on the lower surface.

29. The airfoil of claim 23 wherein the shock control protrusion includes one of a plurality of shock control protrusions extending along an axis from an inboard location on the lower surface to an outboard location on the lower surface.

* * * * *